(12) United States Patent
Palle

(10) Patent No.: US 10,760,689 B2
(45) Date of Patent: Sep. 1, 2020

(54) MULTIPURPOSE FLOW CONTROL ARRANGEMENT

(71) Applicant: VID FIRE-KILL APS, Svendborg (DK)

(72) Inventor: Carsten Palle, Baar (CH)

(73) Assignee: VID FIRE-KILL APS, Svendborg (DK)

( * ) Notice: Subject to any disclaimer, the term of this patent is extended or adjusted under 35 U.S.C. 154(b) by 60 days.

(21) Appl. No.: 15/112,077

(22) PCT Filed: Jan. 16, 2015

(86) PCT No.: PCT/DK2015/050012
§ 371 (c)(1),
(2) Date: Jul. 15, 2016

(87) PCT Pub. No.: WO2015/106767
PCT Pub. Date: Jul. 23, 2015

(65) Prior Publication Data
US 2016/0341319 A1 Nov. 24, 2016

(30) Foreign Application Priority Data
Jan. 17, 2014 (DK) .................................. 2014 70022

(51) Int. Cl.
*F16K 1/12* (2006.01)
*F16K 31/383* (2006.01)
(Continued)

(52) U.S. Cl.
CPC .............. *F16K 1/126* (2013.01); *A62C 35/68* (2013.01); *F16K 27/02* (2013.01); *F16K 31/363* (2013.01); *F16K 31/383* (2013.01); *F16K 31/406* (2013.01)

(58) Field of Classification Search
USPC .................................................. 137/535, 536
See application file for complete search history.

(56) References Cited

U.S. PATENT DOCUMENTS 2,233,649 A * 3/1941 Stahl ..................... F16K 15/063
137/533.25
3,860,073 A 1/1975 Willms
(Continued)

FOREIGN PATENT DOCUMENTS

| CN | 85109329 A | 8/1987 |
| CN | 1102463 A | 5/1995 |

(Continued)

OTHER PUBLICATIONS

Search Report from Denmark Application No. PA 2014 70022, dated Sep. 1, 2014, 4 pages.
(Continued)

*Primary Examiner* — Daphne M Barry
(74) *Attorney, Agent, or Firm* — Michael Best & Friedrich LLP

(57) ABSTRACT

A device for controlling flow of a flow agent in a pipe system, the device comprising: a pipe housing (1) comprising a pipe cavity (2) with one or multiple openings in a pipe cavity wall of the pipe cavity, the one or multiple openings defining an outlet port (3) of the device, and the pipe cavity having an open end defining an inlet port (6) of the device, and a closed end (7), wherein the closed end is closed by a dismountable end body (15); the pipe cavity comprising a first portion having a first cross sectional area and a second portion having a reduced cross sectional area (4), smaller than the first cross-sectional area, the second portion being located between the open end and the one or multiple openings in the pipe cavity wall.

8 Claims, 5 Drawing Sheets

(51) Int. Cl.
F16K 31/363 (2006.01)
F16K 31/40 (2006.01)
A62C 35/68 (2006.01)
F16K 27/02 (2006.01)

(56) References Cited

U.S. PATENT DOCUMENTS

| | | | |
|---|---|---|---|
| 4,070,000 | A | | 1/1978 Prescott |
| 4,313,466 | A | * | 2/1982 Adams .................. F16K 1/04 |
| | | | 137/454.6 |
| 4,586,533 | A | | 5/1986 Estes |
| 5,738,332 | A | | 4/1998 Perez Corbalan |
| 5,954,138 | A | | 9/1999 Gabriel |
| 2003/0102137 | A1 | | 6/2003 Bermes |

FOREIGN PATENT DOCUMENTS

| | | |
|---|---|---|
| CN | 1104918 C | 4/2003 |
| CN | 201368205 Y | 12/2009 |
| DE | 102010029825 A1 | 12/2011 |
| EP | 0769644 A1 | 4/1997 |
| EP | 2428714 A1 | 3/2012 |

OTHER PUBLICATIONS

International Search Report from International Application No. PCT/DK2015/050012, dated Apr. 10, 2015, 4 pages.
Written Opinion of the International Searching Authority from International Application No. PCT/DK2015/050012, dated Apr. 14, 2015, 4 pages.
Chinese Patent Office Action for Application No. 201580004969.9 dated Apr. 2, 2018 (9 pages, Statement of Relevance Included).

* cited by examiner

MULTIPURPOSE FLOW CONTROL ARRANGEMENT

CROSS-REFERENCE TO RELATED APPLICATIONS

This is a U.S. national stage entry of International Patent Application No. PCT/DK2015/050012, filed on Jan. 16, 2015, which claims priority to Denmark Patent Application No. PA 2014 70022, filed on Jan. 17, 2014, the entire contents of all of which are fully incorporated herein by reference.

The present invention relates to a multiple purpose flow control arrangement for control of agent flows from an up-stream agent supply system to down-stream agent consuming fire protection system pipes.

BACKGROUND OF THE INVENTION

The invention is typically applied for controls of water flows in fixed pipe systems for fire protection such as water mist systems, sprinkler systems, hydrant systems and foam systems etc.

It is known to apply valves for control of water flows. For sprinkler and water mist and foam systems the valves are often clapper style valves, where a force-controlled swing clapper controls the water inlet to dry nozzle pipes. This arrangement is called a deluge valve. The swing clapper arrangement is also applied for control of water back flow from wet pipe sprinkler and water mist systems back to the water supply system. This arrangement does usually not apply controlled force on the clapper, which causes the flow control arrangement design to differ significantly from that of deluge valves. A significant problem with the described arrangements is that the described technology causes the arrangements to have large and complex valve bodies which significantly differ for the two valve types. Valve bodies are therefore often cast and large, and the production of valves becomes inflexible to the casting of houses and available molds etc.

Another known arrangement for control of water flows is to control the water flow by controlling the opening inside a pipe body by turning a plate located inside the pipe body around its own center line. Arrangements applying this technology are often called butterfly valves. A problem with butterfly valves is that the valves often are difficult to seal. They are difficult to maintain, and the valve requires manual activation, or complex motor controlled activation to control.

Another known arrangement for control of water flows is to control the opening between a pipe-shaped opening and a plate being pushed horizontally into the opening. This arrangement is often being called a gate valve. A problem with gate valves is that they often require a spindle arrangement to push the plate into the pipe opening. This makes the valve houses become complex and large, where the valve houses often are cast causing inflexible productions, and also the valve to be difficult to maintain. As for butterfly valves the valve requires manual activation, or complex motor controlled activation to control.

Another known arrangement to control water flows is to control the opening in a pipe shaped cavity by turning a ball having a hole inside the pipe cavity, the arrangement is called ball valve. A problem with this arrangement is that it is complex to seal and that corrosion and debris over time have a tendency to cause the ball to be difficult to turn to control the flow. This makes ball valves be unsuitable for installations involving water and other corrosive media where the ball valve is not frequently activated.

Another known arrangement to control water flow is an arrangement having two chambers in two levels which are connected through an opening which may be closed with a plate which is attached to a spindle and/or is sealed with a diaphragm, and where the flow between the inlet and the outlet chamber is controlled by controlling the distance between the opening between the two chambers and the plate closing the opening. The control is often done manually through a spindle attached to the plate or by controlling the pressure inside the diaphragm attached to the plate. This arrangement is commonly called Globe valve. A variant of the globe valve is a globe hydrant valve where a spring applies a force on the plate closing the opening. The spring hereby causes a pressure loss over the valve controlling the outlet pressure of the valve. The valve is closed with the force from a spindle and activates when the spindle force on the plate is manually removed by turning the spindle. A problem with globe valves is that they require complicated housings and become physically large and heavy constructions; valve houses are therefore often cast, which requires molds and introduces errors such as cast porosities and other casting problems to the production of valves.

Another known arrangement to control water flow is an arrangement consisting of a pipe cavity having a polymeric balloon body located in the pipe cavity. The balloon swells up to reduce the opening between the pipe wall and the balloon surface when the internal pressure inside the balloon increases. The valve type is commonly called for Ball valve. This way Ball valves control water flows by controlling the internal water pressure inside the ball. A problem with ball valves is that the life time of the product depends on the life time of the polymeric ball, and that the valves need to be replaced from pipe systems to be maintained.

Another known arrangement to control water flows is an arrangement where a polymeric sleeve is located around a body located inside a pipe body, and where the ends of the sleeve are sealed to the pipe body. The arrangement is commonly called a sleeve valve. The sleeve valve controls the flow between inlet and outlet ports by controlling the pressure between the pipe surface and the outside surface of the sleeve. Problems with sleeve valves are that the life time of the product depends on the life time of the polymeric ball, and that the valves need to be replaced from pipe systems to be maintained.

It is desirable to overcome one or more of the above mentioned problems.

BRIEF DESCRIPTION OF THE INVENTION

It is an object of the present invention to provide a multiple purpose flow control arrangement for control of agent flow from an up-stream agent supply system to down-stream agent consuming fire protection system pipes as mentioned in claim 1.

Hereby is achieved that the spool body forms a seal towards the seat, and the construction of the arrangement determines the agent flow. Additionally the end body may be dismounted and removed, such that the spool body may be removed from the pipe cavity through the opening.

Some embodiments of the invention concern a device for control of flow in pipe systems for fire protection, which comprises a housing having a pipe cavity with an opening in both ends and one or multiple openings in the pipe cavity wall. The one or multiple openings in the pipe cavity wall define at least one outlet port in the tubular pipe cavity wall.

The opening in one end of the pipe cavity defines an inlet port; this end will also be referred to as the open end. The opening at the other end of the pipe cavity, opposite the open end, is closed by a dismountable end body. This end will also be referred to as the closed end as it defines neither an inlet nor an outlet port for the main flow. Nevertheless, in some embodiments, the end body may have one or multiple openings into the pipe cavity forming pilot flow lines for facilitating the flow control. The pipe cavity forms a cross section area reduction located between the open pipe cavity end and the openings in the pipe cavity wall, and where a spool body with larger cross section area than that of reduced pipe cavity in one or multiple locations, and smaller cross section area than that of the not reduced pipe cross section area is located inside the pipe cavity, and where the spool body rest on the end surface of the diameter reduction in the pipe cavity and seals to the pipe cavity wall in one or multiple locations between the opening or openings in the pipe cavity wall and the ended end of the pipe cavity. And where the spool body has one or multiple openings having two or multiple openings which hydraulically connects the pipe cavity having reduced cross section area with the pipe cavity volume which is located between the pipe cavity closed end and the sealing between the spool body and the pipe cavity wall.

In some embodiments, the housing may be formed by a tee-pipe.

The device operates in that the open pipe cavity end performs as an inlet port to the device and is connected to an agent supply system. Liquid flows from the supply port through the inlet port. The agent pressure presses the spool body back and against the closed end of the pipe cavity, and agent flows out through the outlet port opening in the pipe cavity wall. Agent does also flow through the openings and cavity in the body to exit from the opening in the pipe cavity closed end. When opening in the pipe cavity end is closed, the agent flowing through the spool body builds up an agent pressure between the spool body and the closed end of the pipe cavity. This applies a force on the spool body which pushes the spool body to rest on a recess in the pipe cavity wall which is caused from the reduction of the pipe cavity diameter. The pipe cavity having larger cross section area than that of the reduced pipe cavity diameter causes the force pushing the spool body towards the recess to be larger than the force pushing the body away from the recess, this recess forms a seat for the spool body, and the spool body seals against the seat of the recess in the pipe cavity inhibiting agent from flowing through the inlet port and out through the outlet port opening in the pipe cavity surface.

A variation of the above described device is characterized in that the pipe cavity reduction consists of a ring body. The ring body may be a pipe body which may be an insert into the pipe cavity of the housing. The ring body may stretch into the area of the pipe cavity where one or multiple openings are present.

The variation performs in that agent flowing through the displacement opening between the seat and the spool body can flow through a much larger outlet opening with the same body displacements. This causes less pressure losses and makes larger clearances between pipe cavity wall and body possible.

A second variation of the described device is characterized with a compressed spring located between the closed pipe cavity end and the spool body inside the pipe cavity to apply a spring force on the spool body pressing the spool body surface against the seat of the surface of the pipe cavity reduction.

The variation performs with that the spool body always rest at the seat, and that the spring load causes agent to flow through the spool body with a pressure similar to the spring force divided with the cross section area of the reduced pipe cavity reduction. This way the spring load reduces tendencies of agent to leak from openings in the pipe cavity wall when agent supply is switched on, and opening in the ended cavity wall is closed.

A third variation of the device is characterized with the housing consisting of an assembly of a Pipe Tee Fitting with standard pipe connections fitted, and the closed pipe cavity being ended with a flange. This variation allows the device to be constructed from available standard components, and makes it simple to install the device in pipe systems and to maintain and service the device.

A forth variant of the device is characterized by that the body inside the cylinder pipe cavity ends in a shaft portion which reaches into the pipe cavity diameter reduction, and where there is located a guide body inside the cylinder pipe at a location between its open end and the diameter reduction recess, a seat, where the body rests, and where the guide body is penetrated with one or multiple openings, allowing flow to pass the guide body, and where the shaft portion of the spool body penetrates one or multiple of the openings in the guide body.

The variation performs in that the spool body is guided to seat best possible on the valve seat reducing risks of leakages.

A fifth variation of the device is characterized by that one or more openings in the end body of the closed pipe end ends in a one or multiple devices which can be opened and closed manually or remotely.

The variation makes it possible to control the displacement of the body from the seat, and hereby to control pressure loss of agent flows, and to open and close for agent flows.

A sixth variation of the device is characterized by the pipe cavity reduction have a concave cone surface and that the spool body in the pipe cavity has a matching convex cone surface with a smaller angle than that in the pipe cavity reduction.

The variation performs in causing a graduate change in opening area to spool body displacement. To reduce tendencies to pressure circuits in pipe outlet and agent supply systems.

A seventh variation of the device is characterized by the closed pipe cavity end being closed with a end body having one or multiple openings into the pipe cavity which ends in a cavity which connects two cavities (chambers) in line around the same centerline, and where the one chamber are hydraulic connected to one or multiple openings in the pipe cavity wall, and where a pilot spool body, which has one or multiple cavities with openings are located in the line of cavities to have one or multiple of its openings located in each of the chambers, and where the pilot spool body section located in the chamber having hydraulic connection to opening in the pipe cavity wall has larger cross section area than the opening in the chamber which connects the chamber to the other end chamber in the line of cavities, and where the body reaches into the other end chamber in the cavity line where the body end has no opening to cavity in the body and is sealed to the chamber wall, and where a compressed spring supply an axial force on the body, and where the shaft portion length of the pilot spool body located in the two chambers are longer than the distance between the chambers, and where the cavity connecting the two chambers has a larger cross section area than that of the pilot spool body shaft portion connection the pilot spool body parts located in the two end chambers. And the opening from the second chamber into the cavity forms a bearing and/or a seal with the surface of the shaft portion.

The variation performs in that the opening in pipe cavity wall is connected to outlet pipe system. The variation performs with that the outlet pipe system is hydraulic connected to the line of cavities (chambers) located in the materials forming the end of the closed pipe cavity, and the body transport the agent pressure to the one side of the body piston in the spring chamber of the chamber cavity line. When the agent pressure in the pipe outlet system provide a force on the pilot spool body piston which is higher than that of the spring load, the pilot spool body moved towards the spring, and hereby reduces or closes the opening from the cavity which connects the opening in the ended pipe cavity end to the outlet pipe system, causing water pressure to build up between the body in the pipe cavity and the pipe cavity ending and the device to close or reduce the agent flow from the inlet port through the opening in the pipe cavity wall and to the outlet pipe system. When the agent pressure decrees the spring opens the opening and the body in the pipe cavity moves away from its seat allowing more agent to flow into the outlet pipe system. This way the variation allows the invention to perform pressure control in pipe outlet system without having to have connection to drain.

BRIEF DESCRIPTION OF THE DRAWINGS

Embodiments of the invention will be described in the following with reference to the drawings wherein FIG. 1 shows an example on the invention with flange pipe connections and flanged assembly of the End Body to the device housing, and integrated agent connection line in spool body which is guided from a shaft portion penetration a guided body located in the device inlet.

FIG. 2 shows an example on the invention with flange pipe connections and flanged assembly of the End body to the device housing, and outside trimmed agent connection line, and spool body which is guided from a shaft portion penetration a guided body located in the device inlet.

FIG. 3 shows an example where the housing is a weld assembly of standard pipe tee-fitting, and three standard pipe flanges, with the valve seat made from a pipe piece having the seat surface located in the outlet port area, and a spool body having integrated agent connection line with strainer protection of control system against clogging from debris, and shaft shaped end shaft portion which guides the location of the Spool Body inside the pipe cavity from penetrating an opening in a guided body which is located inside the pipe cavity in the inlet volume.

FIG. 4 shows an example utilizing an end flange body and trim for control of agent flow and agent pressure to down-stream agent consuming system.

DETAILED DESCRIPTION OF THE INVENTION WITH REFERENCE TO THE FIGURES

Figure 1:
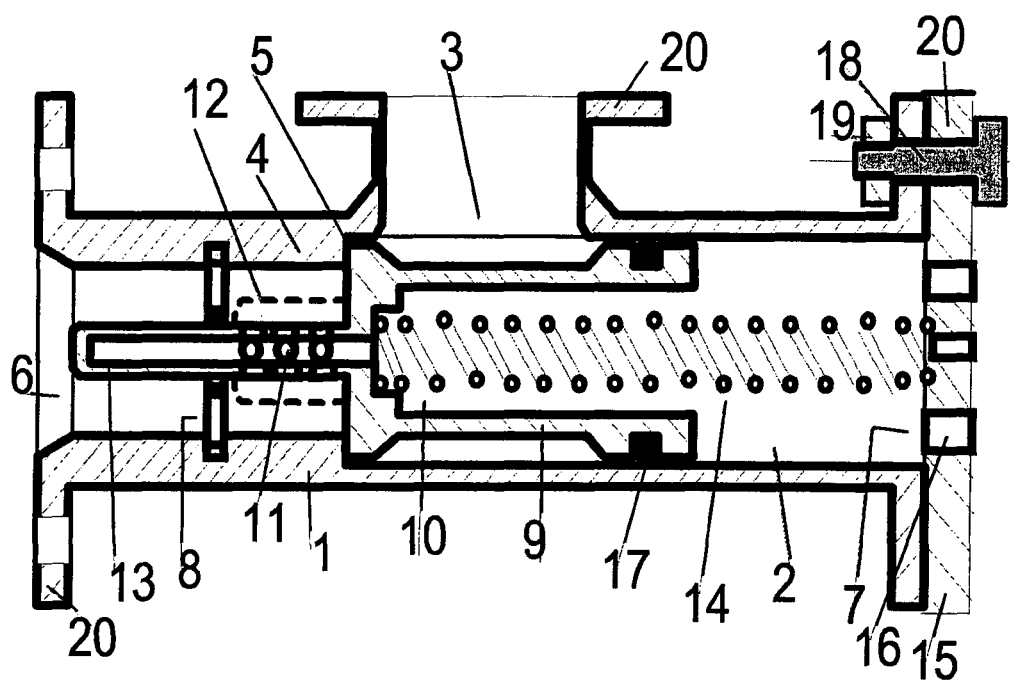
FIG. 1 shows an example on the invention with one outlet port opening in the pipe cavity wall, and with a hollow spool body having a shaft portion penetrating a guide body located inside the housing, and a compressed spring acting on the spool body and the pipe cavity closed end. Furthermore.

FIG. 1, shows an example utilizing a housing (1) with a pipe cavity (2) having an open inlet port (6) and a closed end (7) and minimum one opening in the pipe cavity wall, an outlet port (3), illustrated as a branched off opening leading into a branched off cavity, and a spool body (9) located in the pipe cavity which has a seat surface, which can rest on a seat (5) in the pipe cavity volume.

The device performs with agent flows through the inlet port into one or more openings (11) in a portion of the spool body (9) and through the spool body to the closed pipe cavity volume between the dynamic spool body sealing (17) and the end body (15) of the pipe cavity (2), where the agent pressure apply a force on the body. Because the pipe cavity cross section area is larger than the seat hole area, the body is pressed against the seat (5), and agent can hereafter not flow through the inlet port (6) and out through the outlet port (3).

When one or multiple openings in the end body (15) is opened agent will flow from the pipe cavity volume between the spool body and the end body, this creates a reduced agent pressure and a reduced force on the back of the spool body, and the force on the front of the spool body will cause the spool body to travel towards the end body, which allows agent to flow through the inlet port and out through the outlet port.

From controlling opening in end body flow through the inlet port and out through the outlet port is controlled.

On FIG. 1 the spool body is formed with a pointed end which penetrates a hole in a guide body (8) and a dynamic spool body seal (17). This ensures that the spool body seats as intended on the body seat surface to minimize leakage over the seat (5).

The end body (15) is attached to the flange (20) of the housing (1) with bolts and nuts (18,19). This makes it technically simple to service the device. When dismounting the end body (15) from the housing the spool body (9) with spool body seals (17) and gaskets can come out of the housing (1) to be services, with the device still being installed in the pipe work.

Figure 2:
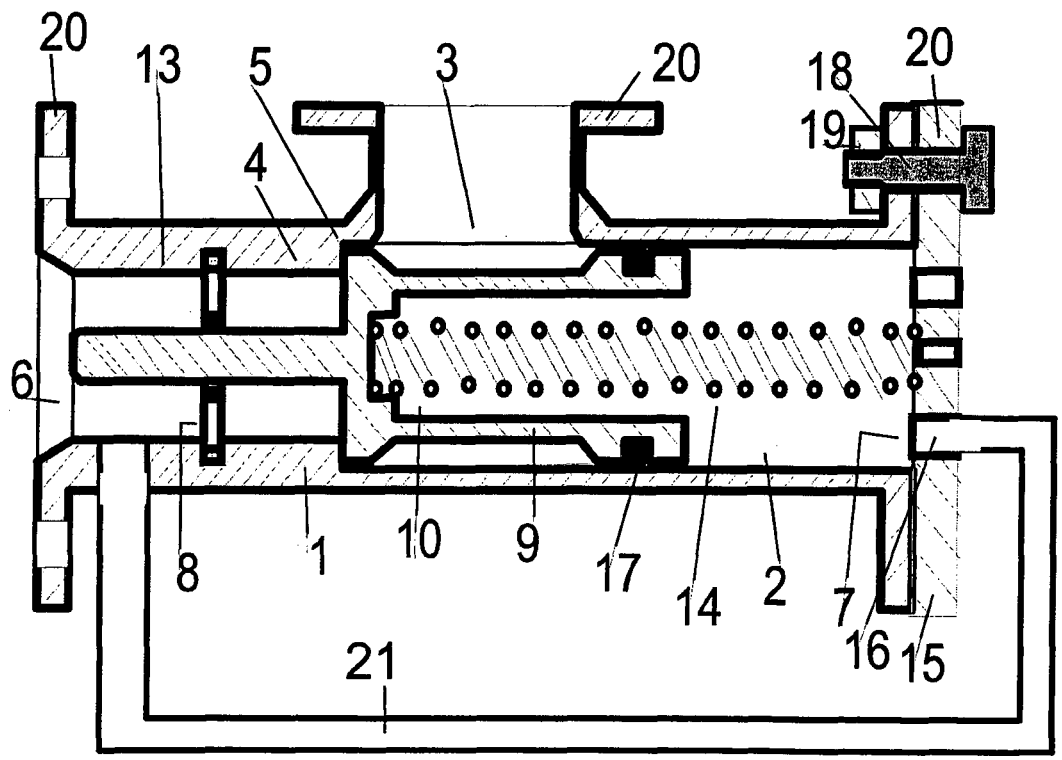
FIG. 2: shows an example on the invention with one opening in the pipe cavity wall, and with a solid body with a shaft portion which penetrate a guide body located inside the housing having flanged connections, and a compressed spring between the pipe cavity closed end and the spool body, and with an outside hydraulic connection between the device inlet port and the volume between the body and the removable closed pipe cavity end. Furthermore.

FIG. 2, shows an example utilizing a housing (1) in the shape of a pipe Tee having a cylindrical pipe cavity (2) with an opening in the pipe cavity wall, an outlet port (3) with a branched off pipe cavity, and both the cylinder pipe cavity and the branched off cavity (3) ends with flanges (20), and the one pipe cavity closed end (7) ends with a end body (15), which is bolted, by blot (18) and nut (19) to the flange of the closed end, and an open end at the inlet port (6), and where the housing (1) has a reduced pipe cavity cross section (4) which is located between the branched outlet port (3) in the pipe cavity and the open pipe cavity inlet port (6), which ends in an end body (15) which forming a seat which faces the closed end (7) of the pipe cavity (2), and a spool body (9) is located in the pipe cavity (2), and where the spool body (9) rests on the end body (15) in the pipe cavity, and where the one end of the spool body ends in a shaft portion, which penetrates a guide body (8) which has multiple openings, and which are located in the pipe cavity volume between the inlet port (6) and the outlet port (3), and where the spool body (9) in the pipe cavity volume between its outlet port (3) and its closed end (7) forms a dynamic spool body seal (17) to the pipe cavity wall, and a compressed spring (14) is located in the pipe cavity between the spool body (9) and the flanged end body (15) at the closed end (7) of the pipe cavity, and where a hydraulic connection (21) connects the pipe cavity volume between the inlet port (6) and the end body (15) to the pipe cavity volume between the spool body and the end body (15).

The open pipe cavity inlet port (6) is connected to up-stream agent supply system, and the outlet port (3) to the branched off cavity (3) connected to a down-stream pipe system. The spring (14) supply a force on the spool body (9), which holds the spool body seated against the seat (5) in the housing (1). When the agent supply system is activated agent will flow through the inlet port (6) into the pipe cavity volume between the inlet port (6) and the sealed seat and from here through the hydraulic connection cavity (21) to the pipe cavity volume between the spool body and the end body (15). Here the agent pressure provides a hydraulic force on the spool body (9) in the direction towards the seat (5), which is proportional to the pipe cavity cross section. This force together with the spring force is larger than the hydraulic force which the agent pressure in the pipe cavity reduction volume (4) applies on the spool body (9), and the spool body rests on the seat, preventing agent from passing the seat (5) to flow into the not reduced pipe cavity volume and from here through the outlet port into the branched off opening into the down-stream connected pipe system. When one or multiple openings in the flange end body (15) opens, the hydraulic pressure decreases in the pipe cavity volume between the spool body (9) and the flange end body (15). This causes the force equilibrium to change between the hydraulic force acting in the seat (5) area and the pipe cavity area of the spool body to change. And the spool body (9) will travel in direction towards the flange end body (15), compressing the spring (14) until a new force equilibrium occurs, and allowing agent to flow pass the inlet opening and out through the branched off outlet port (3) to enter the down-stream pipe work, which is connected to the branched off pipe connection.

Figure 3:
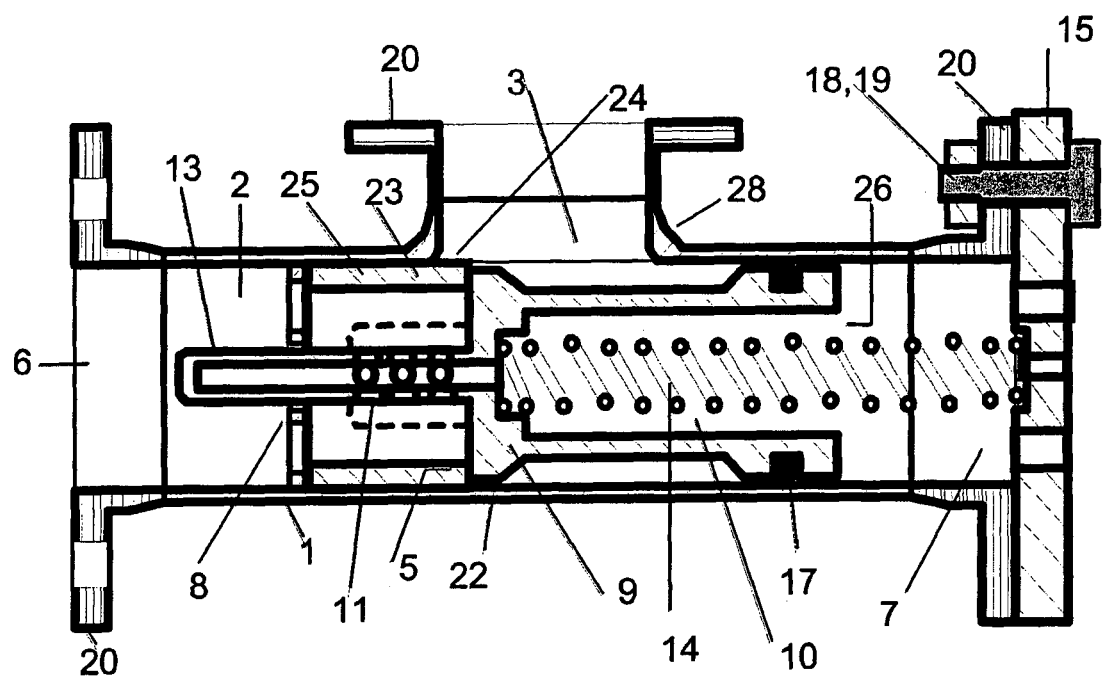
FIG. 3: Shows an example on the invention having the device housing build from standard pipe fittings in the form of Tee and flanges and blind flange. And with body resting on a seat located on a ring body, where the seat a location at the same position as an outlet port opening in the pipe cavity wall, and where the water ways into the body cavities are protected with a strainer or a filter. Furthermore.

FIG. 3 shows an example of the device when utilized for control of inlet to system installed down-stream the device, utilizing a housing (1) in the shape of a pipe Tee having a cylindrical pipe cavity (2) with an open end at the inlet port (6) and a closed end (7) and an opening in the pipe cavity wall, an outlet port (3), and where the openings of the pipe cavity ends in flanges (20). Inside the pipe cavity (2) a ring body (25) is sealed to the pipe cavity wall between the open end inlet port (6) and the opening in the pipe cavity wall. The ring body (25) may be a portion of a pipe, wherein the ring body (25) has a seat (5), which faces towards the closed end (7) of the pipe cavity (2), and a part (24) of the ring body (25) is located in the area of the opening of the outlet port (3) in the pipe cavity wall. A guide body (8) with comprises one or multiple openings are located in the pipe cavity volume between the opening of the inlet port (6) and the seat (5). A spool body (9) with a shaft portion (13) and a dynamic spool body seal (17) is located in the pipe cavity (2) with it shaft portion penetrating an opening in the guide body (8) and with its largest cross section diameter located between the seat (5) and the closed end (7) of the pipe cavity (2), and with the dynamic spool body seal (17) providing a seal between the surface of the spool body (9) and the pipe cavity wall surface in location between the opening in the pipe cavity wall and the closed end (7) of the pipe cavity. A compressed spring (14), which is located between the flange end body (15) which closes the closed pipe cavity end and the spool body (9) supply a spring force on the spool body (9) which presses the spool body to form a seat connection with the seat (5) of the ring body (25). A cavity (10) in the spool body connects one or more openings (11) in the spool body, which is hydraulic connected to the pipe cavity volume between the open inlet port (6) and the area of the seat (5) to the opening (26) which is connected to the pipe cavity volume between the dynamic spool body seal (17) and the closed end (7) of the pipe cavity. The example has the characteristics that the housing (1) consists of an assembly of standardized pipe fittings in the form of a standard pipe tee (28) and three standard pipe flanges (20), which are welded together, and that the seat (5) at the ring of the ring body is located within the opening area of the outlet port (3) opening in the pipe cavity wall.

The housing is flanged to the system pipes with an up-stream agent supply system pipe flange to the pipe flange on the open pipe cavity inlet port (6) and a down-stream nozzle system pipe flanged on the flange (20) connected to the outlet port (3) in the pipe cavity wall. In standby the force of the spring (14) pushes the spool body seat to rest on the seat (5) of the ring body (25), which is located in a distance (24) inside the area of the outlet port in the pipe cavity (2) wall. The agent supply is activated to apply agent pressure to the device. With openings closed in the end body (15) the agent flows through the open inlet port (6) into pipe cavity volume and through the openings in the guide body (8) to fill the pipe cavity volume between the inlet port and the seat (5). From this volume agent flows through a filter mesh openings (12) into the openings (11) in the spool body (9) and into the spool body cavity (10) and through the opening (26) into the pipe cavity volume (2) between the dynamic spool body seal (17) and the flange end body (15). The mesh can be a form of strainer or a filter. Here the spring (14) and the agent pressure provide a force which presses a seat surface on the spool body (9) against the seat s (5) on the ring body (25). The force of the spring and the hydraulic force acting in the volume which is limited by the spool body (9) and the flange body (15) is larger than the force from the agent supply acting on the seat (5) hole area, which causes the seat (5) and seat surface between the ring surface and the spool body to be tight. The spring load on the spool body helps keeping the seat (5) sealed when filling the volume between the spool body (9) and the flange end body (15) with closed openings with agent. The shaft portion (13) in the guide body (8) hole and the dynamic spool body seal (17) between the spool body (9) and the pipe cavity wall guides the spool body (9) to rest correctly on the seat (5) reducing agent leak between the spool body seat surface and the seat (5) of the ring body (25). The use of standard pipe components makes a highly flexible product, which is independent on house castings and casting molds. The seat (5) being displaced into the area of the outlet port, allows the device to have less friction loss with small spool body displacements. It should be noticed that the device functions also without the displaced seat and the guided spool body.

Figure 4:
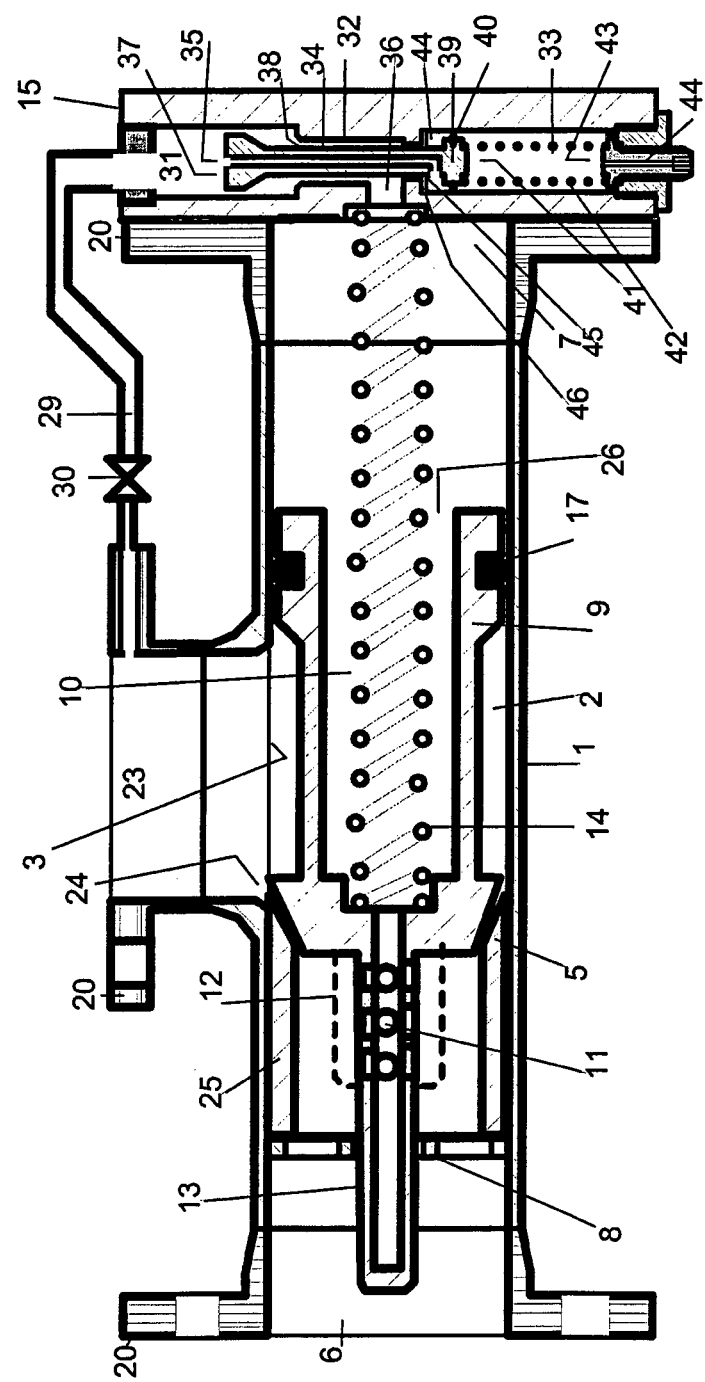
FIG. 4: shows an example of the invention where the pipe cavity is ended with a body having a series of connected cavity chambers, which are located on the same center line and having a hydraulic connection to the pipe cavity volume between the end pipe cavity end and the spool body, and a spring loaded body having a cavity with two openings located inside the string of cavities, and a hydraulic connection with a stop valve located between the outlet port and the string of cavities, and the body inside the pipe cavity having a conical convex seat matching a conical concave seat on a seat ring located inside the pipe cavity. Furthermore.

FIG. 4 shows an example on the device for control of agent pressure in systems installed down-stream the device. The device utilizes housing (1) in the shape of a pipe Tee having a cylindrical pipe cavity (2) with an open end at the inlet port (6) and a closed end (7) and an opening in the pipe cavity wall, an outlet port (3). The three openings in the housing cavities have flanges (20). Inside the pipe cavity (2) a ring body (25) is located attached to the housing and sealed to pipe cavity wall between the inlet port (6) at the open end and the outlet port (3) opening in the pipe cavity wall. The ring body (25) has a concave cone shaped end surface to form a seat (5), the cone surface faces the pipe cavity closed end (7), and a part of the ring body (25) is located in the area of the outlet port (3) opening. A guide body (8) with one or multiple openings is located in the pipe cavity volume between the inlet port (6) opening and the seat surface (5). A spool body (9) having a shaft portion (13), a concave cone seat (5) surface and a dynamic spool body seal (17) is located in the pipe cavity (2) with the shaft portion (13) penetrating the guide body (8) and with its largest cross section diameter located between the conical shaped seat (5) and the closed end (7) of the pipe cavity (2), and with the dynamic spool body seal (17) providing a seal between the spool body (9) surface and the pipe cavity wall surface between the outlet port (3) opening in the pipe cavity wall and the closed end (7) of the pipe cavity. A compressed spring (14), is located between the flange end body (15) and the spool body (9) supplies a spring force to the spool body (9) which presses the conical spool body surface to seat in the seat (5) on the ring body (25). The concave seat surface has conical angle 5-20 degrees larger than that of the convex seat surface. A cavity (10) in the spool body connects one or more openings (11) in the spool body surface which seals the pipe cavity volume between the open inlet port (6) end and the seat (5) area to the opening (26) to the pipe cavity volume between the dynamic spool body seal (17) and the flange end body (15).

The example which FIG. 4 shows is characterized with that the flange end body (15) has a line of connected chambers, which are located around the same centerline and consists of a connection chamber (31) connected to a middle chamber (32) which are connected to a control chamber (33). The middle chamber (32) is further more connected to the pipe cavity (2) via an opening (36) in the flange end body (15) surface, which ends the pipe cavity (2). A pilot spool body (34) is located in the line of chambers (31), (32), (33). The pilot spool body (34) has a bone shape body with enlarged diameters at it's two ends with a shaft portion between the ends. The shaft portion has a length, which are longer than the distance between the connection chamber (31) and the control chamber (33) allowing the pilot spool body (34) to travel inside the line of cavities. In the connection chamber (31) the pilot spool (34) has diameter (37), which are larger than the diameter of the opening (38), which connects the connection chamber (31) to the middle chamber (32). In the control chamber the pilot spool (34) ends in a pilot spool body piston (39) having a closed piston surface (41) and a dynamic seal (40) to the cylinder surface of the of the control chamber (33). The pilot spool body (34) has a cavity with openings which hydraulically connects the connection chamber (31) to the control camber (33) volume (44), which is located between the inlet opening (45) which dynamically seals to seat (46) to the pilot spool body shaft portion and the pilot spool body piston seat (46). The pilot spool body consists of multiple parts allowing it to be installed inside the line of cavities. A compressed spring (42) is located in the control camber (33) between the pilot spool body piston (39) and an adjustable device (43) to the control chamber, which on FIG. 4 is shown as a threaded device. The control chamber has an opening to the outside (44) through the spring adjustment device (43).

The device are installed in pipe work with flanged or other types of pipe connections, with the up-stream agent supply system connected to the inlet port (6), and the down-stream system connected to the branched off outlet opening with connection to outlet port (3) in the pipe cavity (2) wall. And the connection chamber (31) on the flanged on the end body (15) is hydraulically connected to the outlet cavity (23) of the device with a hydraulic connection line (29), with a two way stop valve (30). When agent supply is turned on to get access to the device, agent will flow through the inlet port (6) of the device, and into the pipe cavity (2) volume, which is sealed with the convex concave spool body (9) seat (5) where the spool body rests on the concave seat of the ring body (25), and which are hold in contact from the force of a spring (14). Agent flows through the strainer mesh (12) and into the openings (11) in the spool body (9) and into a cavity in the spool body and through opening (27) into the pipe cavity (2) volume between the spool body seal (17) to the pipe cavity wall and the flanged on the end body (15). A pre-set force which the adjustment device (43) sets on the pilot spring (42) in the control camber (33) applies force on the pilot spool body (34), which in the connection chamber (31) holds the enlarged end (37) of the pilot spool body (34) away from the opening (38) from the connection chamber (31) to the middle chamber (32). Agent flows from the pipe cavity (2) into the opening (36) from the pipe cavity to the connection chamber (31) and from here agent flows through the clearance between the pilot spool body shaft portion (34) and the Opening (38) between the connection chamber (31) and the middle chamber (32), into the connection chamber (31) and from here into the hydraulic connection line (29), where the stop valve (30) stops the agent from flowing further into the device outlet port and further into the down-stream system, and agent pressure similar to the agent supply pressure builds up in the pipe cavity (2) volume between the spool body seal (17) and the flange end body (15) with the connected above described connected agent filled volumes. The force acting on the back of the spool body (9) from the agent pressure acting on the pipe cavity (2) cross section diameter and the spring (14) is together higher than the force from agent pressure action on the seat (5) hole area on front of the spool body (9), which keeps the seat (5) sealed. When the stop valve (30) is opened, agent starts to flow from the pipe cavity (2) volume between the spool body seal (17) and the end body (15) via the hydraulic connection line (29) and the string of cavities (31) & (32) and the opening (36) in the end body (15) to the Down-Stream system. This agent flow makes the agent pressure decrease behind the spool body (9), and the force pushing the spool body (9) in forward direction becomes smaller than the force pushing the spool body (9) back in direction against the end body (15), and the spool body (9) travels away from the seat (5), and agent flows through the seat (5) and into the outlet port (3) opening in the pipe cavity wall and from here into the down-stream system where the agent flow builds up an agent pressure. This agent pressure is via the hydraulic connection line (29) and the open stop valve (30) connected to the connection chamber (31), and through the opening (35) in the pilot spool body feed into a control volume (44) in the control chamber (33), which are located between the opening (45) with seat (46) to the pilot spool shaft portion in the control chamber (33) to the middle chamber (32) and the piston seal (40) on the pilot spool body (34) in the control chamber. The Force Equilibrium on the pilot spool piston (39) in the control chamber between the force from the agent pressure and the force from the pilot spring (42) controls the size of the opening (38) between the middle chamber (32) and the connection chamber (31) from pulling and pushing the enlarged end (37) of the pilot spool body (34) closer to or further away from the opening (38), and this way controlling the flow from the pipe cavity (2) volume behind the spool body (9), and hereby the agent pressure closing the seat (5), and hereby the flow from agent supply to down-stream systems, and hereby the pressure build up in the down-stream system.

Figure 5:
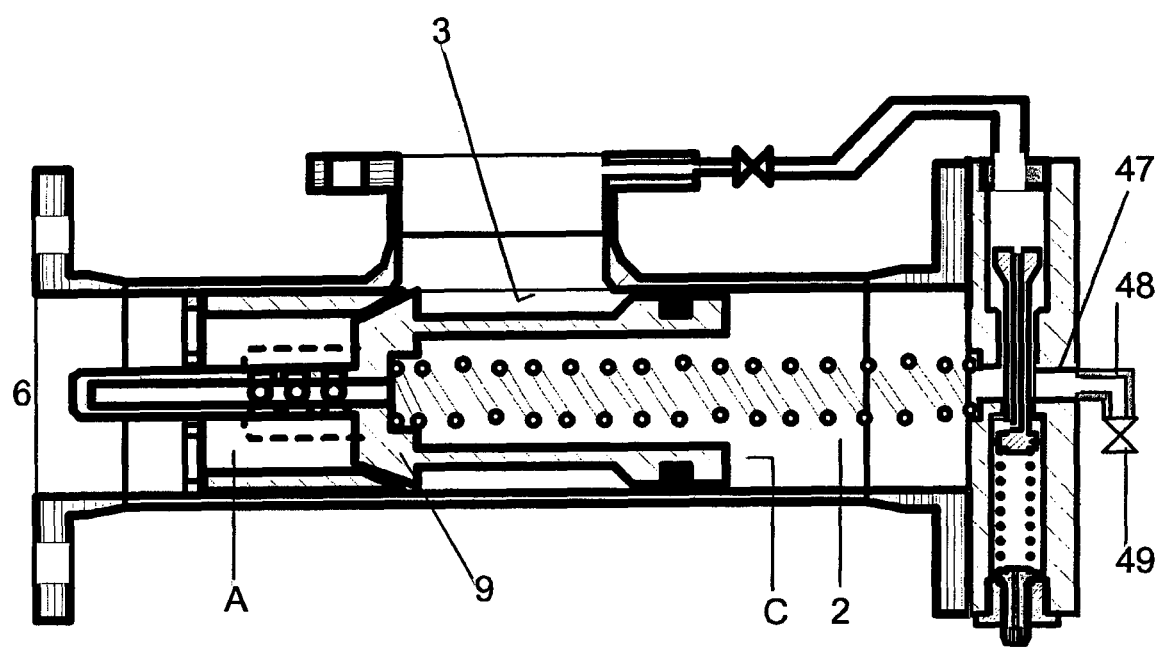
FIG. 5: Shows an example of the example shown in FIG. 4 having an flanged end flange with override performance.

FIG. 5: shows an example of the example which is shown in FIG. 4. The Example has the characteristic of including a security device in form of a hydraulic connection (48) and a two way valve (49), which via an opening (47) in the end body (15) is connected to the pipe cavity (2) volume located between the spool body (9) and the end body (15).

With the valve (49) in closed position the example performs as described for the example which FIG. 4 shows, and controls the agent pressure in the down-stream system having agent consumption, from controlling the pressure loss on the flow from the inlet port (6) to the outlet port (3) over the seat (5) of the device.

When the valve (49) is opened the agent drains from the pipe cavity (2) volume, which is located behind the spool body (9) end surface (C). It causes the hydraulic pressure acting on spool body surface area (C) to decrease, and the force from the agent pressure acting at the opposite end of the spool body (9) becomes able to forces the spool body (9) to travel away from the seat (5) and towards the end body (15), which makes the device to provide its maximum flow capacity to the agent supply pressure. And hereby provide a complete override of the pressure control performance as described for FIG. 4. When the valve (49) is reclosed, the override stops and the device return to perform its intended performances.

Figure 6:
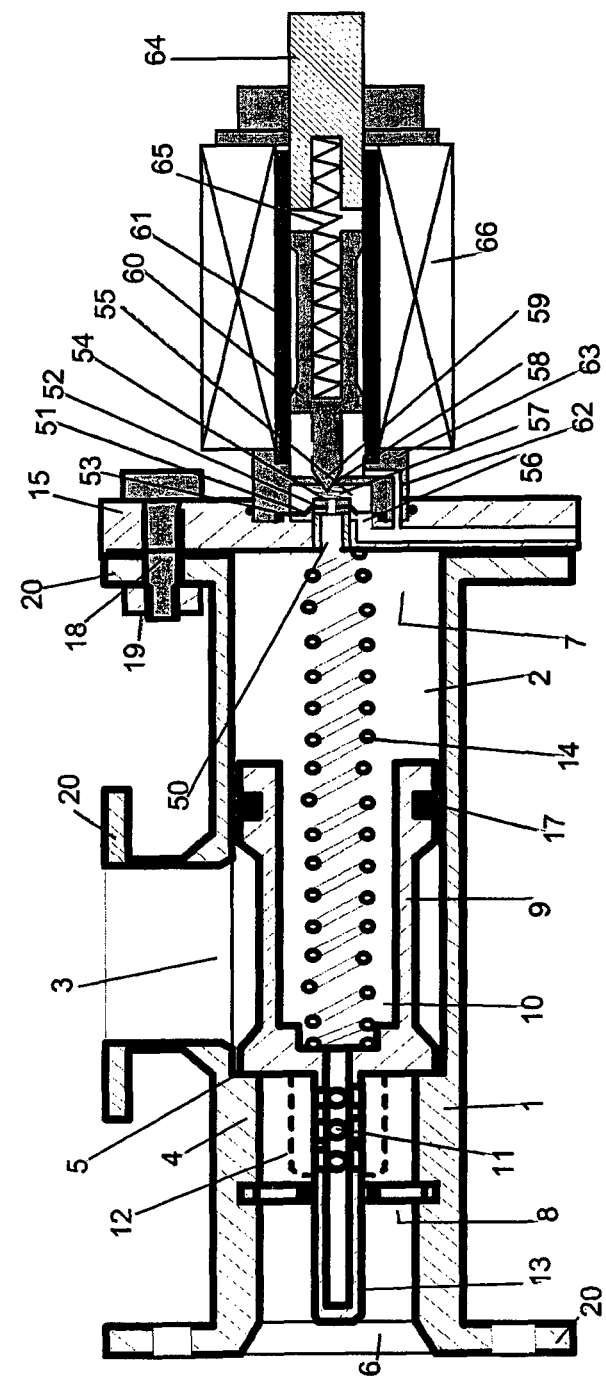
FIG. 6: Shows an example of the examples shown in FIG. 1 and FIG. 2 having a flange End Body with integrated electrical control.

FIG. 6: shows an example to the example in FIG. 1, which is characterized by the pipe cavity (2) is ended with an end body (15) having an opening (50) in the surface facing the pipe cavity (2), which ends in a seat surface (51) which is closed with a seal body (52), which is attached to a diaphragm (53). An orifice (54) in the seal body/diaphragm provides a connection, which allows little flows of agent to flow through the body/diaphragm assembly into a diaphragm chamber (55) behind the diaphragm. A drain cavity (56) is connected to the surface on the other side of the diaphragm, and a compressed pilot spring (57) is located in the diaphragm chamber (55) to apply a closing force on the seal body (52) sealing the opening (50) into the pipe cavity (2) volume between the dynamic spool body seal (17) and the end body (15) surface. An opening (58) in the diaphragm chamber (55) is sealed with the tip surface of a needle (59). The needle (59) is attached to an armature (60) made in a soft magnetic material. The armature and the needle (59) is located in a cylinder volume (61) having opening (62) to a drain connection (56). The cylinder wall is made of a non-magnetic material. The cylinder volume (61) is in one end attached to the housing (63), which also houses the diaphragm chamber (55), the other end of the cylinder volume (61) is sealed with a plug (64), which is made in a magnet soft material. A compressed spring (65) is located between the armature (60) and the plug (61) and via the armature applies a closing force on the needle tip (59). The cylinder volume (61) is surrounded with a solenoid (66), which when electrical energized generates a magnetic field from the plug (64) which supplies a pull force on the armature (60).

The example is installed in pipe work with agent supply pipe installed up-stream the open pipe cavity inlet port (6), and the agent consummating system inlet pipe installed down-stream the outlet port (3) opening to the pipe cavity (2). When the agent supply system is activated agent flows into the inlet port (6) and through openings in the guide body (8) and through the filter mesh (12) openings, and through one or more openings (11) and through the spool body (9) into the volume behind the spool body (9), where the force of the compressed pilot spring (57) holds the opening (50) closed with spring force on a seal body (52) acting on a seat surface (51). Agent leaks through an orifice (54) in the seal body (52) into a closed diaphragm chamber (55), where the agent builds up a static pressure which together with the pilot spring apply a force on the seat body (52) which keeps the opening in the end body closed, and the static agent pressure in the pipe cavity (2) volume acting on the full cross section area of the dynamic spool body seal (17) has a magnitude similar to that of the agent pressure on the inlet port (6), which acts on the spool body area similar to the opening area of the seat (5) surface. With the seat opening area being smaller than that of the cross section area of the pipe cavity, and the agent pressure being similar in front of the seat (5) area and that behind the dynamic spool body seal, the spool body seat against the seat (5) and there is no hydraulic connection between the supply system located up-stream the device and the agent consummation located down-stream the device. When the solenoid (66) becomes electrical energized, an magnetic field occurs, which magnetize the plug (64) end which faces the armature and the armature (60) end which faces the plug, with inverted magnetic poles, and a magnetic force between the two surfaces will pull the two surfaces towards each other against the force of the pilot spring (65). This removes the needle tip away from the opening (58) in the diaphragm chamber (55), and agent will flow from the diaphragm chamber into the cylinder volume (61) and from here through the drain connection (66) to drain. This creates a reduced agent pressure in the diaphragm chamber, and the agent pressure in the opening (50) acting on the seal body (52) provides a larger force than the force from the pilot spring and the agent pressure in the diaphragm chamber, which lifts the seal body (52) from the seat (51) and agent from the pipe cavity (2) volume behind the spool body (9) flows through the opening (50) in the end body (15) pass the seat surface (51) and the seal body (52) to drain via the drain connection (56) in the end body (15). This causes the agent pressure in the pipe cavity (2) behind the spool body (9) to drop and the higher agent supply pressure at the inlet port (6) will force the spool body (9) away from the seat (5) and agent will flow through the inlet port (6) pass the seat (5) and the spool body (9) and pass the outlet port (3) opening in the pipe cavity (2) into the down-stream agent consuming system. When electric power to the solenoid is turned off, the agent pressures re-build, and the device returns to its state before the solenoid was energized.

In an embodiment, the multiple purpose flow control arrangement for control of agent flows from up-stream agent supply system to down-stream agent consuming fire protection system pipes, which consists of a pipe housing having a pipe cavity with one or multiple openings in the pipe cavity wall making the device's outlet port, and an open end making the device's inlet port, and a closed end, and a seat surface with an opening making a reduced pipe cavity diameter, and in which a spool body is located, and where the spool body forms a seal to the seat, which is characterized by the closed end of the pipe cavity is closed with an end body, which design determines the agent flow control characteristics of the device, and where the fully assembled spool body may be removed from the pipe cavity through the opening the End Body closes when the End Body is dismounted the device.

In a further embodiment, the arrangement the spool body in its one end ends in a shaft portion having smaller diameter than the opening in the valve seat of the pipe cavity of the device housing, and where the shaft shaped ending of the spool body penetrates one or multiple opening in a guide body which is located in the pipe cavity of the devices housing between the open cavity end and the seat surface in the pipe cavity, and where the spool body in one or multiple locations between the opening in the pipe cavity wall of the devices housing and the end body ending the pipe cavity forms one or multiple dynamical seals to the device housing.

In a further embodiment, the spool body outer diameter is smaller than the diameter of the pipe cavity end of the device housing which is closed with a removable end body, and where the spool body in one or multiple locations has an outer diameter which are larger than the diameter of the opening in the seat surface of the diameter reduction seat in the pipe cavity of the devices housing.

In a further embodiment, a compressed spring being located between the end body which ends the pipe cavity of the devices housing and the spool body located in the pipe cavity of the devices housing, supplying a force which force the spool body to press against a seat surface located in the pipe cavity.

In a further embodiment, the devices housing consisting of an assembly of common pipe fittings, in the shape of Tee-fitting, and pipe fittings for pipe connections.

In a further embodiment, the spool body having a cavity with one or multiple openings to its outside surfaces, which when the spool body seals against the seat in the pipe cavity, is located in on or multiple locations up-stream the seat in the pipe cavity of the device housing and down-stream the dynamic seal between the spool body and the device house, and which together performs as an agents pilot supply line for the spool body location control, which is located inside the device housing.

In a further embodiment, the device housing being fitted with a pilot supply pipe connecting the pipe cavity volume between the device inlet and the spool body seat to the device housing to an opening into the pipe cavity volume between the spool body end and the end body attached to the device housing.

In a further embodiment, the inlets openings to pilot agent supply lines located upstream the spool body seat being protected with strainer or filters having openings which is less than the water ways of the control systems.

In a further embodiment, the device performing pressure control on agent flow to down-stream system by help of the device having an end body attached to end the pipe cavity, which contains one or multiple openings connecting the pipe cavity volume between the spool body and the end body to a cavity which connects two chambers located around the same axial center. And where the one chamber is connected to the outlet port of the device, and where an axial movable pilot spool body is located in the two chambers, and where the pilot spool body in the chamber which is connected to the device outlet port has larger diameter than that of the opening connecting the chamber to the opening into the pipe cavity of the device, and where the pilot spool body end in the other chamber forms a piston in in a cylinder, and where there is a connection through the pilot spool body connecting the chamber with connection to the device outlet port to a cavity located to a position between the pilot spool body piston shape and the connection from the other chamber, and where a compressed pilot spring is located in the cylinder chamber between the pilot spool body piston shape and a device to regulate the pilot spring compression.

In a further embodiment, the device having an end body fitted to end the pipe cavity volume, which is fitted with an override valve in the form of an integrated electrical operated device and, or a valve fitted to the end body, which when opened connects the pipe cavity volume located between the spool body and the end body to drain outside the device.

The invention claimed is:

1. A device for controlling flow of a flow agent in a pipe system, the device comprising:

a pipe housing comprising a pipe cavity, the pipe cavity including an outlet port of the device, an open end defining an inlet port of the device, and an opposite end, wherein the opposite end is opposite the open end and closed by a dismountable end body; the pipe cavity comprising a first portion having a first cross sectional area and a second portion having a reduced cross sectional area, smaller than the first cross-sectional area, the second portion being located between the open end and a seat surface of a valve seat defining an opening between said first and second portions;

a spool body located in the pipe cavity movable between a closed position and an open position, where the spool body in the closed position forms a seal to the seat surface, wherein the spool body may be removed from the pipe cavity when the end body is dismounted from the opposite end of the pipe cavity so as to provide an opening to the pipe cavity;

wherein the spool body at one end comprises a shaft portion having a smaller diameter than the opening defined by the valve seat of the pipe cavity; and wherein the device comprises a guide body located in the pipe cavity between the inlet port and the seat surface wherein the shaft portion of the spool body penetrates one or multiple openings in said guide body;

wherein the spool body defines a cavity with one or multiple openings to outside surfaces of the spool body which, when the spool body seals against the valve seat in the pipe cavity, are located up-stream the valve seat, and with one or more openings to the second portion of the pipe cavity; wherein the second portion of the pipe cavity is sealed from the outlet port by a dynamic seal between the spool body and the pipe housing, and wherein the cavity of the spool body forms a pilot supply line for controlling the spool body location.

2. A device in accordance with claim 1, wherein the spool body has an outer diameter smaller than a diameter of the opposite end of the pipe cavity which is closed with the end body, and where the spool body in one or multiple locations has an outer diameter which is larger than a diameter of the second portion.

3. A device in accordance with claim 1, wherein a compressed spring is located between the end body and the spool body, the spring supplying a force which forces the spool body to press against the seat surface located in the pipe cavity.

4. A device in accordance with claim 1, wherein the pipe housing comprises an assembly of common pipe fittings, in the shape of Tee-fitting, and pipe fittings for pipe connections.

5. A device in accordance with claim 1, wherein the end body comprises one or multiple openings connecting the pipe cavity to a second cavity which connects a connection chamber and a middle chamber located around a same axial center, and where the connection chamber is connected to the outlet port of the device, and where an axially movable said pilot spool body is located in the connection chamber and the middle chamber, and where a first portion of the pilot spool body in the connection chamber has larger diameter than that of an opening connecting the connection chamber to the pipe cavity of the device, and where a second portion of the pilot spool body in the middle chamber forms a piston, and where there is an opening through the pilot spool body connecting the connection chamber with the middle chamber, and where a compressed pilot spring is located in the middle chamber between the pilot spool body and a device configured to regulate the pilot spring compression.

6. A device in accordance with claim 1, wherein the end body is fitted with an override valve in the form of one of an integrated electrical operated device or a valve fitted to the end body which, when opened, connects the second portion of the pipe cavity to the outside of the device.

7. A device in accordance with claim 1, further comprising a flow channel connecting the first portion of the pipe cavity with the second portion of the pipe cavity, and wherein when the end body is attached to the pipe housing and the spool body is in a closed position, the flow channel forms a pilot supply line for controlling the spool body location.

8. A device in accordance with claim 7, wherein the pilot supply line includes a pilot inlet open to the second portion, and wherein the pilot inlet is protected with a strainer or filter having openings which are smaller than the cross-sectional size of the pilot supply line.

\* \* \* \* \*